(12) United States Patent
Mita et al.

(10) Patent No.: US 8,960,803 B2
(45) Date of Patent: Feb. 24, 2015

(54) VEHICLE SEAT

(75) Inventors: Hiroyuki Mita, Nagoya (JP); Jun Ueda, Nagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 432 days.

(21) Appl. No.: 13/372,843

(22) Filed: Feb. 14, 2012

(65) Prior Publication Data

US 2012/0205955 A1 Aug. 16, 2012

(30) Foreign Application Priority Data

Feb. 16, 2011 (JP) ................................. 2011-030975

(51) Int. Cl.
*A47B 97/00* (2006.01)
*B60N 2/60* (2006.01)
*B60N 2/22* (2006.01)

(52) U.S. Cl.
CPC ............... *B60N 2/6009* (2013.01); *B60N 2/22* (2013.01)
USPC ................. 297/463.1; 297/463.2; 297/354.12

(58) Field of Classification Search
USPC ........ 297/452.2, 452.18, 463.1, 463.2, 216.1, 297/216.13–18, 354.12
See application file for complete search history.

(56) References Cited

U.S. PATENT DOCUMENTS

| 4,909,572 | A | * | 3/1990 | Kanai ....................... 297/452.38 |
| 5,002,339 | A | * | 3/1991 | Yamashita et al. ........ 297/354.12 |
| 5,007,682 | A | * | 4/1991 | Kuwabara et al. ........ 297/452.38 |
| 5,078,452 | A | * | 1/1992 | Tilly et al. ................. 297/354.12 |
| 5,158,339 | A | * | 10/1992 | Miyanaga ...................... 297/482 |
| 5,288,133 | A | * | 2/1994 | Mizushima et al. ...... 297/452.38 |
| 5,390,982 | A | * | 2/1995 | Johnson et al. ................ 297/410 |
| 5,599,070 | A | * | 2/1997 | Pham et al. .................... 297/483 |
| 5,711,577 | A | * | 1/1998 | Whalen ....................... 297/361.1 |
| 5,795,024 | A | * | 8/1998 | Collins et al. .............. 297/361.1 |
| 5,988,756 | A | * | 11/1999 | Aufrere et al. ............ 297/452.18 |
| 6,068,340 | A | * | 5/2000 | Yano et al. .................... 297/478 |
| 6,149,241 | A | * | 11/2000 | Waku et al. ................. 297/463.2 |
| RE37,026 | E | * | 1/2001 | Whalen ....................... 297/361.1 |
| 6,170,898 | B1 | * | 1/2001 | Cunningham et al. ..... 296/65.16 |
| 6,273,510 | B1 | * | 8/2001 | Ehemann ................... 297/440.22 |
| 6,299,239 | B1 | * | 10/2001 | Sagawa et al. ........... 296/187.12 |
| 6,582,023 | B2 | * | 6/2003 | Houston et al. ............... 297/470 |
| 6,685,272 | B1 | * | 2/2004 | Bonk et al. ................. 297/463.1 |

(Continued)

FOREIGN PATENT DOCUMENTS

| JP | 6-135298 | 5/1994 |
| JP | 8-337136 | 12/1996 |

(Continued)

OTHER PUBLICATIONS

Chinese Office Action dated Jan. 13, 2014, along with English-language translation thereof.

*Primary Examiner* — Laurie Cranmer
(74) *Attorney, Agent, or Firm* — Greenblum & Bernstein, P.L.C.

(57) ABSTRACT

A vehicle seat is provided with an operation portion that protrudes toward a rear seat from an opening formed at an outer shield and that is used to unlock a recliner from the rear seat side and a reinforcement member that is attached to a cushion frame side so as to cover a notch formed near the opening of the outer shield. Engagement hooks that engage with respective engagement holes formed at edges of the notch and a fixing portion that is fixed to a plate provided at the cushion frame side are formed at the reinforcement member.

3 Claims, 5 Drawing Sheets

(56) References Cited

U.S. PATENT DOCUMENTS

| | | | | |
|---|---|---|---|---|
| 7,070,223 B2 * | 7/2006 | Jeong | ............... | 296/65.03 |
| 7,237,846 B1 * | 7/2007 | Arima | ............... | 297/452.38 |
| 7,360,842 B2 * | 4/2008 | Sayed et al. | ............... | 297/463.1 |
| 7,635,167 B2 * | 12/2009 | Okazaki | ............... | 297/483 |
| 7,810,881 B2 * | 10/2010 | Beneker et al. | ............... | 297/216.1 |
| 7,971,932 B2 * | 7/2011 | Niitsuma et al. | ............... | 297/216.14 |
| 7,997,656 B2 * | 8/2011 | Inagaki et al. | ............... | 297/452.38 |
| 8,011,732 B2 * | 9/2011 | Lindsay | ............... | 297/463.1 |
| 8,162,404 B2 * | 4/2012 | Ueda | ............... | 297/463.1 |
| 8,287,048 B2 * | 10/2012 | Smith et al. | ............... | 297/463.1 |
| 8,302,994 B2 * | 11/2012 | Ko | ............... | 280/801.1 |
| 8,353,561 B2 * | 1/2013 | Yamazaki et al. | ............... | 297/452.38 |
| 8,678,506 B2 * | 3/2014 | Beneker et al. | ............... | 297/452.18 |
| 8,678,507 B2 * | 3/2014 | Yamazaki et al. | ............... | 297/463.1 |
| 8,714,648 B2 * | 5/2014 | Tanaka et al. | ............... | 297/378.1 |
| 2003/0038524 A1 * | 2/2003 | Bruck | ............... | 297/452.18 |
| 2003/0116999 A1 * | 6/2003 | Fujita et al. | ............... | 297/216.13 |
| 2003/0160498 A1 * | 8/2003 | Boelstler et al. | ............... | 297/483 |
| 2004/0183356 A1 * | 9/2004 | Philippot et al. | ............... | 297/452.18 |
| 2005/0035647 A1 * | 2/2005 | Matsunuma | ............... | 297/452.18 |
| 2005/0140190 A1 * | 6/2005 | Kawashima | ............... | 297/216.14 |
| 2005/0168041 A1 * | 8/2005 | Glance et al. | ............... | 297/452.18 |
| 2007/0145807 A1 * | 6/2007 | Gundall et al. | ............... | 297/452.18 |
| 2009/0152929 A1 * | 6/2009 | Sung et al. | ............... | 297/452.18 |
| 2011/0057498 A1 * | 3/2011 | Fujita et al. | ............... | 297/452.18 |
| 2011/0115274 A1 * | 5/2011 | Hazlewood | ............... | 297/378.12 |
| 2012/0292971 A1 * | 11/2012 | Tanaka et al. | ............... | 297/354.12 |

FOREIGN PATENT DOCUMENTS

| | | |
|---|---|---|
| JP | 2002-142913 | 5/2002 |
| JP | 2010-228614 | 10/2010 |
| KR | 10-2009-0047672 | 5/2009 |

* cited by examiner

VEHICLE SEAT

INCORPORATION BY REFERENCE

The disclosure of Japanese Patent Application No. 2011-030975 filed on Feb. 16, 2011 including the specification, drawings and abstract is incorporated herein by reference in its entirety.

BACKGROUND OF THE INVENTION

1. Field of the Invention

The invention relates to a vehicle seat, and more specifically it relates to a vehicle seat of which a recliner can be unlocked by pulling an operation portion, protruding toward a rear seat side from an opening formed at an outer shield, rearward from the rear seat side.

2. Description of Related Art

A vehicle seat is known which has a recliner that can be unlocked by pulling an operation portion (strap), protruding toward a rear seat side from an opening formed at an outer shield, rearward from the rear seat side. Japanese Patent Application Publication No. 2010-228614 describes a vehicle seat in which a reinforcement member (bezel) is provided at an edge of an opening of an outer shield. According to this structure, even when the recliner is unlocked by pulling the operation portion obliquely rearward from the rear seat side, the outer shield does not break and does not fall off from the cushion frame, and therefore the handleability of the operation portion is high.

According to the structure described in Japanese Patent Application Publication No. 2010-228614, however, since the reinforcement member is fixed to the cushion frame side using screws, the efficiency of the work for attaching the reinforcement member is low.

SUMMARY OF THE INVENTION

The invention provides a vehicle seat that achieves a high handleability of an operation portion by attaching a reinforcement member such that an outer shield does not break and does not fall off from a cushion frame even when the recliner is unlocked by pulling the operation portion obliquely rearward from the rear seat side, and also achieves a high efficiency of work for attaching the reinforcement member.

The first aspect of the invention relates to a vehicle seat having: a recliner that adjusts an inclination angle of a seatback assembly relative to a seat cushion assembly; an outer shield that covers a side face of a cushion frame of the seat cushion assembly; an operation portion that protrudes toward a rear seat from an opening formed at the outer shield and that is used to unlock the recliner from the rear seat side; and a reinforcement member that is attached to the cushion frame so as to cover a notch formed near the opening of the outer shield. In this vehicle seat, an engagement hook that engages with an engagement hole formed at an edge of the notch and a fixing portion that is fixed to a plate provided at the cushion frame are formed at the reinforcement member. According to the vehicle seat structured as described above, as in the structure described in Japanese Patent Application Publication No. 2010-228614, even when the recliner is unlocked by pulling the operation portion obliquely rearward, the outer shield does not break and does not fall off from the cushion frame, and therefore the handleability of the operation portion is high. According to the vehicle seat structured as described above, further, unlike the structure described in Japanese Patent Application Publication No. 2010-228614, since the reinforcement member is attached using the engagement hook, the reinforcement member can be easily attached, improving the efficiency of the work for attaching the reinforcement member.

The vehicle seat of the first aspect of the invention may be such that the fixing portion is an insert groove into which the plate is inserted so as to be sandwiched by the insert groove in a lateral direction of the vehicle seat as the engagement hook of the reinforcement member is engaged with the engagement hole. According to this structure, since the fixing portion is the insert groove into which the plate is inserted so as to be sandwiched by the insert groove in the lateral direction of the vehicle seat as the engagement hook of the reinforcement member is engaged with the engagement hole, it is not necessary to perform a work for attaching the reinforcement member and a work for fixing the reinforcement member to the plate separately. As such, the work efficiency is high.

The vehicle seat described above may be such that the reinforcement member has an engagement piece facing the engagement hook of the reinforcement member and the engagement hook of the reinforcement member is engaged with the engagement hole by being rotated, relative to the outer shield, about the engagement piece of the reinforcement member. According to this structure, for example, since the reinforcement member can be attached with one hand, the efficiency of the work for attaching, the reinforcement member is even higher.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figures 1A, 1B:
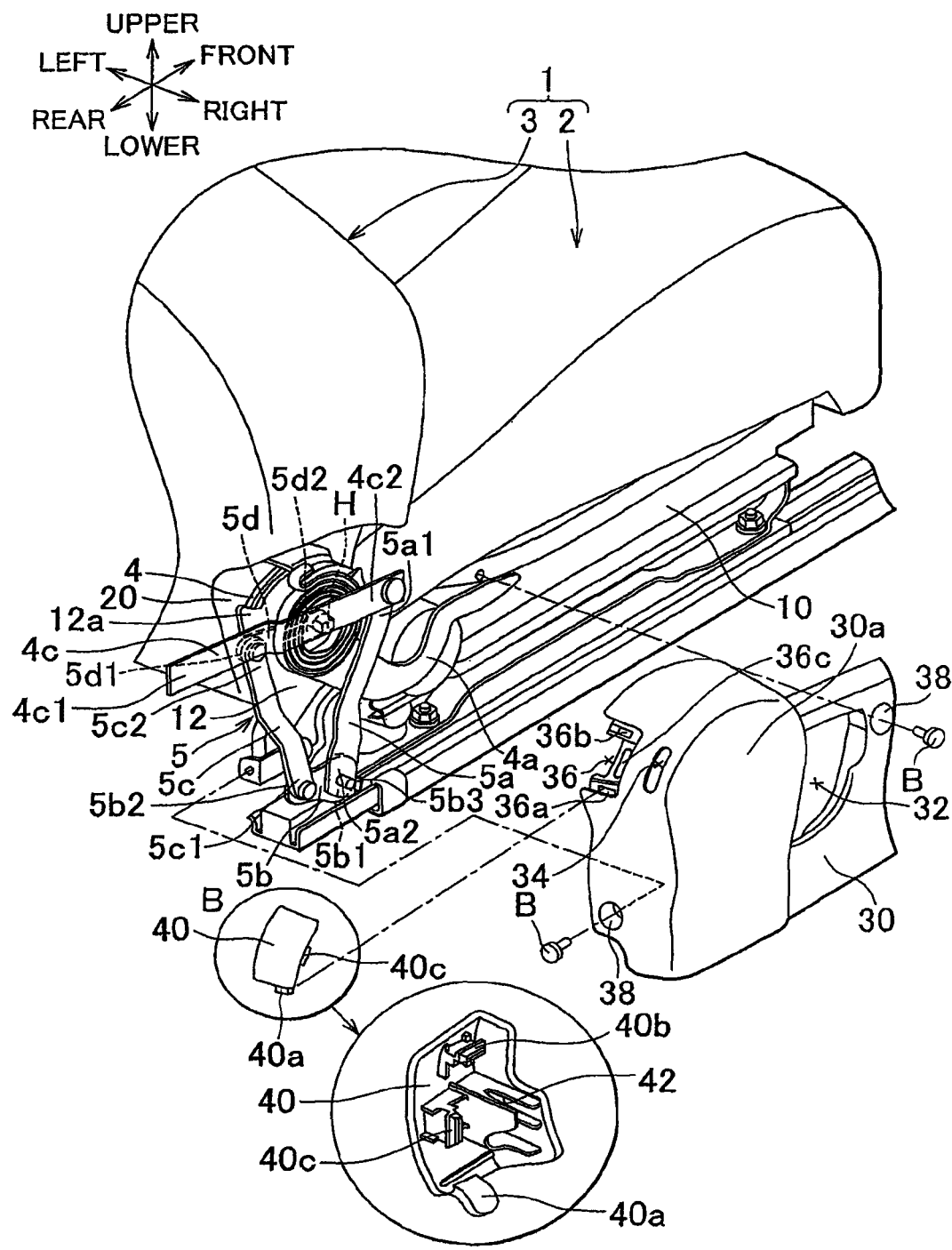
FIG. 1A is a perspective view showing a first row seat of an example embodiment of the invention as viewed from the rear side and showing a state where an outer shield of a seat cushion assembly is not yet attached.
FIG. 1B is an enlarged view showing a cap as viewed from its back side.

Hereinafter, an example embodiment of the invention will be described with reference to FIGS. 1 to 6. In the following, a first row seat 1 (e.g., a driver's seat) will be described as an example of "vehicle seat". Further, although not shown in the drawings, a second row seat is present behind, the first row seat 1. It is to be noted that "upper", "lower", "front", "rear", "left", and "right" in the following descriptions shall be interpreted as corresponding, respectively, to the upper side, lower side, front side, rear side, left side, and right side as viewed in the drawings, that is, the upper side, lower side, front side, rear side, left side, and right side of the first row seat 1.

First, the outline of the structure of a first row seat 1 of the example embodiment of the invention will be described with reference to FIGS. 1 and 2. The first row seat 1 is constituted of a seat cushion assembly 2 and a seatback assembly 3 that are connected to each other via recliners, including a recliner 4, as shown in FIGS. 1 and 2.

More specifically, a lower plate 12 fixed at the rear end, on the right side (the laterally outer side of the vehicle), of a cushion frame 10 of the seat cushion assembly 2 and the right side face of a back frame 20 of the seatback assembly 3 are connected to each other via the recliner 4. On the other hand, a lower plate (not shown in the drawings) fixed at the rear end, on the left side (the laterally inner side of the vehicle), of the cushion frame 10 of the seat cushion assembly 2 and the left side face of the back frame 20 of the seatback assembly 3 are connected to each other via another recliner (not shown in the drawing). The left recliner and the right recliner 4 are connected via a rod (not shown in the drawings) such that the left recliner operates in synchronization with the right recliner 4.

Operating a knob 4a for unlocking the recliner 4 makes the seatback assembly 3 pivotable relative to the seat cushion assembly 2 as needed, allowing the angle of the seatback assembly 3 to be changed to a desired angle with respect to the seat cushion assembly 2. Releasing the knob 4a brings the recliner 4 back to its locked state, locking the seatback assembly 3 at the set angle. As such, the angle (inclination) of the seatback assembly 3 is adjustable with respect to the seat cushion assembly 2.

A strap 4c for allowing the unlocking operation described above to be performed from the rear side (e.g., by a passenger on the second row seat) is provided such that it protrudes rearward, and links 5 are connected to the strap 4c.

The links 5 are four links (i.e., a first link 5a, a second link 5b, a third link 5c, and a fourth link 5d). A first end 5a1 of the first link 5a is pivotally attached to a second end 4c2 of the strap 4c (i.e., the end of the strap 4c that is not operated by passengers). A first end 5b1 of the second link 5b is pivotally attached, together with a second end 5a2 of the first link 5a, to the cushion frame 10.

An L-shaped hook 5b3, bending from the first end 5b1 of the second link 5b, is in contact with an edge of the second end 5a2 of the first link 5a. A first end 5c1 of the third link 5c is pivotally attached to a second end 5b2 of the second link 5b. Further, a first end 5d1 of the fourth link 5d is pivotally attached to a second end 5c2 of the third link 5c.

Meanwhile, a second end 5d2 of the fourth link 5d is fixed to a hinge pin H of the recliner 4. As a first end 4c1 of the strap 4c is operated (i.e., pulled rearward), the first link 5a rotates (i.e., rotates counterclockwise as viewed from the right side), pressing the edge of the second end 5a2 of the first link 5a against the hook 5b3 of the second link 5b.

At this time, the second link 5b rotates (i.e., rotates counterclockwise as viewed from the right side) and thus pulls the third link 5c, causing the fourth link 5d to rotate the hinge pin H of the recliner 4 (i.e., rotate it counterclockwise as viewed from the right side). In this way, the recliner 4 is operated in the same manner as when the knob 4a is used.

As the strap 4c is operated, the recliner 4 is unlocked via the links 5 as described above, whereby the seatback assembly 3 inclines forward, making it easier for a passenger on the second row seat to get out of the vehicle and making it easier for a passenger to get on the second row seat. This is how the seat cushion assembly 2 and the seatback assembly 3 are connected to each other.

A resin-made cover (outer shield 30) for decorating the right side faces of the recliner 4 and cushion frame 10 is provided at the seat cushion assembly 2. The outer shield 30 has an opening 32 through which the knob 4a protrudes, and an opening 34 through which the strap 4c protrudes.

A notch 36, which is generally rectangular and is covered by a cap 40, is formed near the opening 34 of the outer shield 30. The cap 40 is a generally rectangular cover member for covering the notch 36. It is to be noted that the cap 40 is an example of "reinforcement member" in the invention. An engagement piece 40a that is inserted into an engagement hole 36a formed at one of the short side edges of the generally rectangular notch 36 of the outer shield 30 is formed at one of the short sides of the rectangular cap 40.

On the other hand, an engagement hook 40b that engages with an engagement hole 36b formed at the other of the short side edges of the generally rectangular notch 36 of the outer shield 30 is formed at the other of the short sides of the rectangular cap 40. Further, an engagement hook 40c that engages with an engagement hole 36c formed at one of the long side edges of the generally rectangular notch 36 of the outer shield 30 is formed at one of the long sides of the rectangular cap 40.

Multiple engagement hooks (not shown in the drawings) and multiple bolt holes 38 via which the outer shield 30 is attached to the cushion frame 10 are formed of the outer shield 30. The engagement hooks are formed on the inner side of the outer shield 30. The engagement hooks are formed such that they engage in the lateral direction (i.e., the left-right direction) of the seat. On the other hand, one of the bolt holes 38 is formed such that a bolt B is inserted into it in the lateral direction of the seat, while the other of the bolt holes 38 is formed such that another bolt B is inserted into it in the longitudinal direction of the seat.

Figure 2:
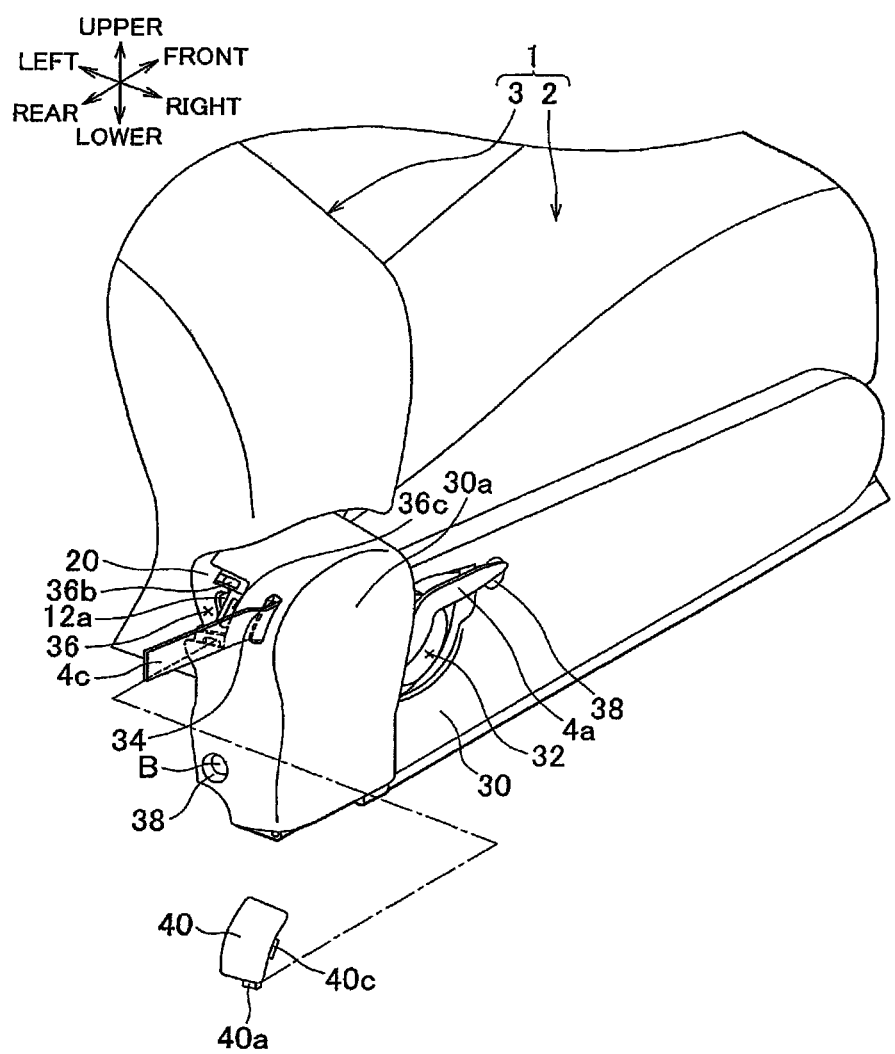
FIG. 2 is a view showing a state where a cushion frame is attached the outer shield from the state shown in FIG. 1A.
Figure 3:
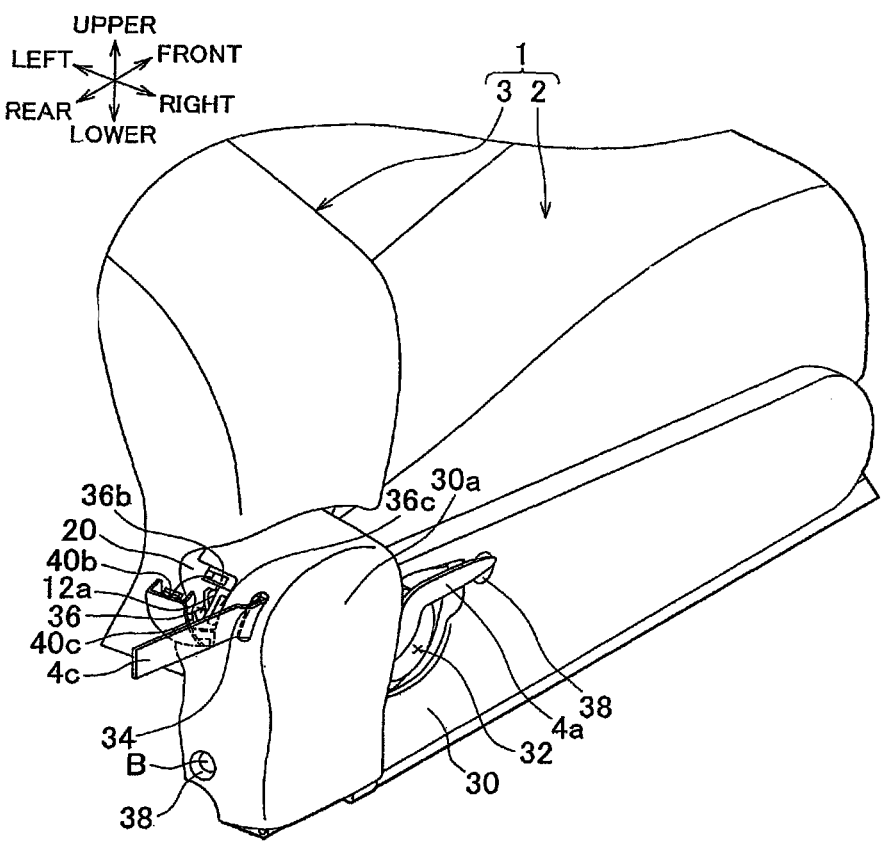
FIG. 3 is a view showing how the cap is attached to the outer shield from the state shown in FIG. 2.
Figure 4:
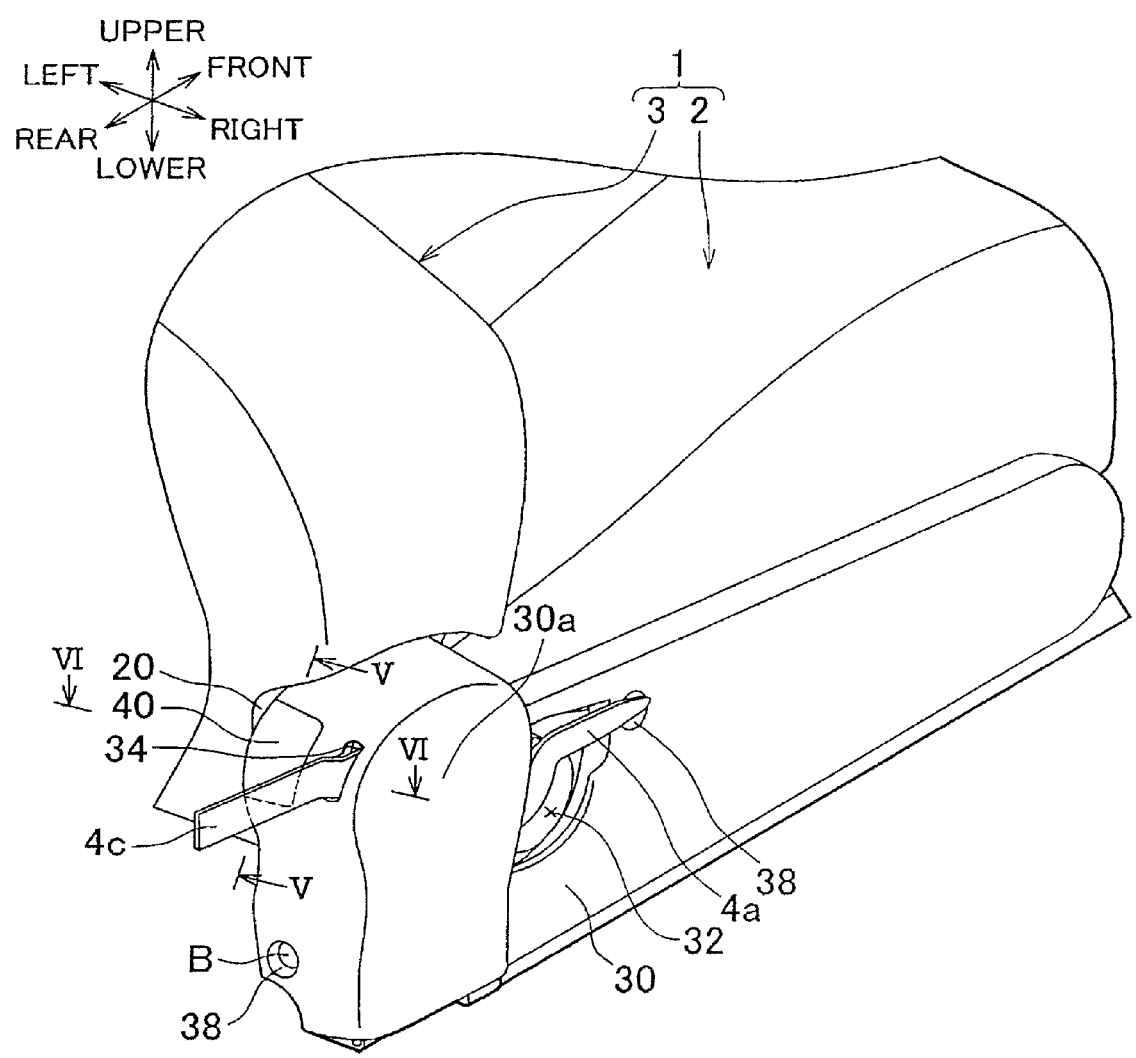
FIG. 4 is a view showing a state where the cap has been attached in its position from the state shown in FIG. 3.
Figure 5:
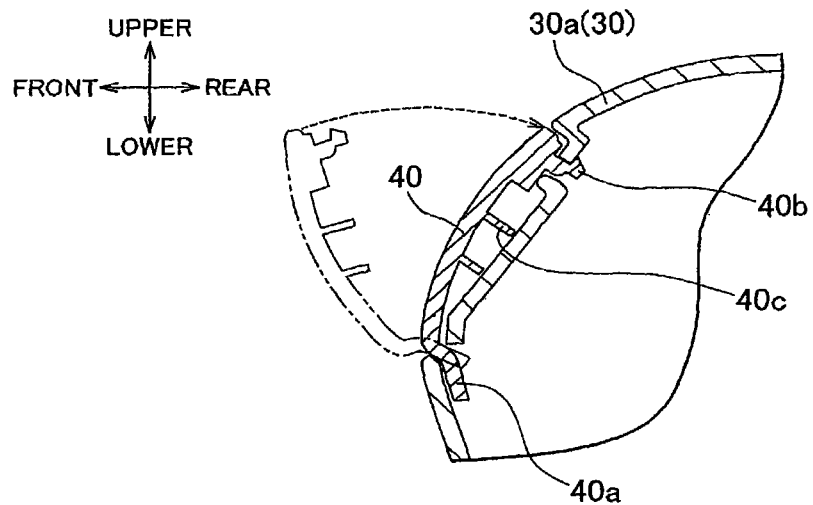
FIG. 5 is a sectional view taken along the line V-V shown in FIG. 4.
Figure 6:
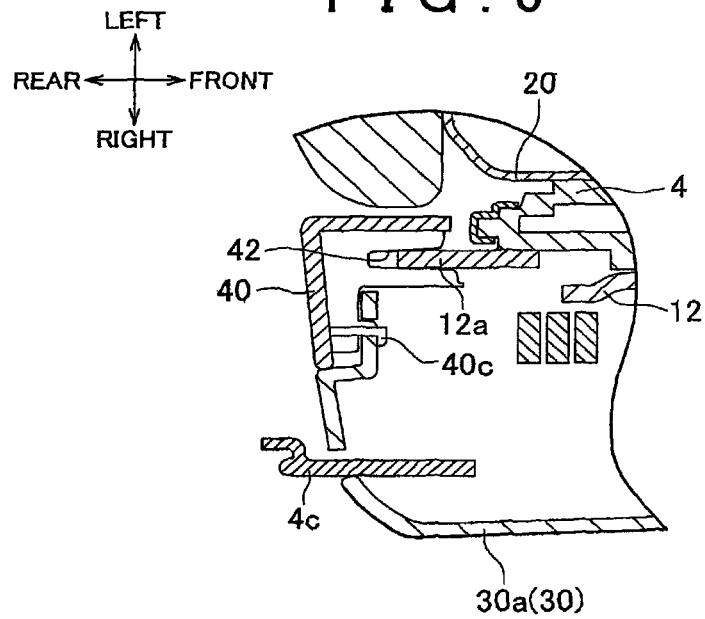
FIG. 6 is a sectional view taken along the line VI-VI shown in FIG. 4.

As shown in FIG. 1A, in order to allow the recliner 4, the knob 4a, the links 5, etc. to be arranged in desired positions, a near-recliner portion 30a of the outer shield 30 can not be attached using a bolt(s), and therefore no bolt hole is formed at the near-recliner portion 30a. Thus, as will be described later, if the outer shield 30 is attached to the cushion frame 10 using the engagement hooks and the bolts B only, the attachment strength at the near-recliner portion 30a is low.

Further, a generally U-shaped insert groove 42 into which a projecting portion 12a formed at the outer periphery of the lower plate 12 is inserted so as to be sandwiched by the insert groove 42 in the lateral direction of the seat is formed at the inner side of the cap 40. The insert groove 42, as will be described later, is formed such that the projecting portion 12a is fit into the insert groove 42 when the engagement hooks 40b and 40c of the cap 40 engage with the engagement holes 36b and 36c of the outer shield 30, respectively. It is to be noted that the insert groove 42 is an example of "fixing portion" in the invention.

Next, the attachment structures of the outer shield 30 and the cap 40 will be described one by one with reference to FIGS. 1 to 6. First, the attachment structure of the outer shield 30, that is, the structure for attaching the outer shield 30 to the cushion frame 10 will be described with reference to FIGS. 1 and 2.

First, the outer shield 30 is attached to the cushion frame 10 using the multiple engagement hooks (not shown in the drawings) from the state shown in FIG. 1A. At this time, the knob 4a and the strap 4c are inserted, respectively, into the openings 32 and 34 of the outer shield 30. Then, the bolts B are inserted into the respective bolt holes 38 and then screwed into the cushion frame 10.

In this way, the outer shield 30 is attached to the cushion frame 10 (refer to FIG. 2). In this state, however, as mentioned earlier, the attachment strength is low at the near-recliner portion 30a of the outer shield 30 since no bolt hole is provided at the near-recliner portion 30a.

Next, the attachment structure of the cap 40, that is, the structure for attaching the cap 40 to the outer shield 30 will be described. First, the engagement piece 40a of the cap 40 is inserted into the engagement hole 36a of the outer shield 30 from the state shown in FIG. 2 (refer to FIGS. 3 and 5). Then, with the engagement piece 40a inserted in the engagement hole 36a, the cap 40 is rotated about the lateral axis running across the engagement piece 40a such that the cap 40 covers the notch 36 of the outer shield 30.

Then, as the notch 36 is covered by the cap 40, the engagement hooks 40b and 40c of the cap 40 engage; respectively, with the engagement holes 36b and 36c of the outer shield 30. In this way, the outer shield 30 is attached to the cap 40 (refer to FIGS. 4 and 5). When the cap 40 is attached on the outer shield 30, as described earlier, the projecting portion 12a of the lower plate 12 is fit in the insert groove 42 of the cap 40 such that the projecting portion 12a is sandwiched by the insert groove 42 of the cap 40 in the lateral direction of the seat (refer to FIG. 6).

The first row seat 1 of the example embodiment of the invention is structured as described above. According to this structure, since the fixing portion of the cap 40 is fixed to the lower plate 12 as the outer shield 30 is attached to the cap 40, the movement of the near-recliner portion 30a of the outer shield 30 is restricted in the direction corresponding to the width of the near-recliner portion 30a. Therefore, even if any bolt is not used to the near-recliner portion 30a of the outer shield 30 in order to allow the recliner 4, the knob 4a, the links 5, etc. to be arranged at desired positions, the attachment strength at the outer shield 30 is high. As such, as in the structure described in Japanese Patent Application Publication No. 2010-228614, even when the recliner 4 is unlocked by pulling the strap 4c obliquely rearward, the outer shield 30 does not break and does not fall off from the cushion frame 10, and therefore the handleability of the strap 4c is high. Further, unlike the structure described in Japanese Patent Application Publication No. 2010-228614, since the engagement hooks 40b and 40c of the cap 40 are used for attachment, the cap 40 can be easily attached, improving the efficiency of the work for attaching the cap 40.

According to the structure described above, further, the cap 40 is fixed to the lower plate 12 by the insert groove 42 of the cap 40 sandwiching the lower plate 12 in the lateral direction of the seat as the engagement hooks 40b and 40c of the cap 40 are engaged. That is, the cap 40 is fixed to the lower plate 12 at the same time as the cap 40 is attached, and therefore it is not necessary to perform a work for attaching the cap 40 and a work for fixing the cap 40 to the lower plate 12 separately. As such, the work efficiency is high.

According to the structure, further, the cap 40 is attached by inserting the engagement piece 40a of the cap 40 into the engagement hole 36a of the outer shield 30 and then rotating the cap 40 about the lateral axis running across the engagement piece 40a. Therefore, for example, the cap 40 can be attached with one hand, and thus the efficiency of the work for attaching the cap 40 is even higher.

The invention has been described with reference to the example embodiment for illustrative purposes only. It should be understood that the description is not intended to be exhaustive or to limit form of the invention and that the invention may be adapted for use in other systems and applications. For example, while the first row seat 1 has been described as an example of "vehicle seat" in the foregoing example embodiment, it is to be noted that "vehicle seat" is not limited to the first row seat 1. That is, for example, it may be "second row seat" of a vehicle having a third row seat.

What is claimed is:

1. A vehicle seat comprising:
    a recliner that adjusts an inclination angle of a seatback assembly relative to a seat cushion assembly;
    an outer shield that covers a side face of a cushion frame of the seat cushion assembly;
    an operation portion that protrudes toward a rear seat from an opening provided at the outer shield and that is used to unlock the recliner from the rear seat side; and
    a reinforcement member that is attached to the cushion frame so as to cover a notch provided near the opening of the outer shield the reinforcement member including:
        an engagement hook that engages with an engagement hole provided at an upper edge of the notch;
        an engagement piece that engages a lower edge of the notch; and
        a fixing portion that is fixed to a plate provided at the cushion frame is provided at the reinforcement member, wherein
        the fixing portion is provided between the engagement hook and the engagement piece.

2. The vehicle seat according to claim 1, wherein
the fixing portion is an insert groove into which the plate is inserted so as to be sandwiched by the insert groove in a lateral direction of the vehicle seat as the engagement hook of the reinforcement member is engaged with the engagement hole.

3. The vehicle seat according to claim 2, wherein
the engagement piece faces the engagement hook of the reinforcement member, and
when the reinforcement member is attached to the outer shield so as to cover the notch, the engagement hook is rotated, relative to the outer shield, about the engagement piece of the reinforcement member to engage with the engagement hole.

* * * * *